United States Patent [11] 3,609,721

[72] Inventor William E. Meneley
Oakland, Calif.
[21] Appl. No. 803,863
[22] Filed Mar. 3, 1969
[45] Patented Sept. 28, 1971
[73] Assignee The Singer Company

[54] METHOD OF CLEARING DUST FROM A MAGNETIC RECORD DISC OR THE LIKE
23 Claims, 16 Drawing Figs.

[52] U.S. Cl. 340/174.1E, 274/47, 340/174.1 R
[51] Int. Cl. G11b 5/00
[50] Field of Search 274/41.4, 47; 179/100.2 P; 340/174.1 E

[56] References Cited
UNITED STATES PATENTS

| | | | |
|---|---|---|---|
| 3,310,792 | 3/1967 | Groom et al. | 179/100.2 |
| 3,366,390 | 1/1968 | Appelquist et al. | 274/47 |
| 3,489,381 | 1/1970 | Jones et al. | 179/100.2 |

*Primary Examiner*—Terrell W. Fears
*Assistant Examiner*—Vincent P. Canney
*Attorneys*—Patrick J. Schlesinger, Charles R. Lepchinsky, Karl H. Sommermeyer and Jay M. Cantor

ABSTRACT: For dislodging and clearing away dust particles from the surface of a magnetic, data-storage disc, the disc is run at operating speed and a flying head is swept across it slowly, for example, at the rate of one-fourth the width of the slider to less than one-twentieth thereof during each revolution of the storage disc. The slider may be round and have a spherical bearing face. Automatic apparatus may control such a sweep as part of a startup sequence.

PATENTED SEP 28 1971

3,609,721

SHEET 1 OF 7

INVENTOR.
William E. Meneley
BY
Karl W. Sommermeyer
ATTORNEY

METHOD OF CLEARING DUST FROM A MAGNETIC RECORD DISC OR THE LIKE

BACKGROUND OF THE INVENTION

1. Field of the Invention

The present invention relates to moving-magnetic-surface, data-storage devices, such as magnetic drums and discs.

A transducer head may "fly" a few tens of microinches off of a magnetic data-storage disc, and therefore may collide with dust particles of that size. Such dust particles, although invisible to the unaided human eye, are hard and sharp and they also disturb the flight of the head and cause damaging collisions between the head and disc.

2. Description of the Prior Art

Prior devices have attempted to remove such dust with bristle brushes, but the individual bristle has a diameter several hundred times the size of the dust particles, so that its action is clumsy, and the brushing action is slow. Typically, such brushing is continued for a full minute. This brushing time causes a serious loss of operating time when discs must be changed frequently.

Summary of the Invention

The flying head of a moving-surface, storage system is operated and controlled, while flying, to move slowly and progressively across the record area so that its slider, and the air under it, displace and sweep away dust particles. The sweeping motion of the slider is slow compared to normal operation, but clears the dust faster and more thoroughly than a brush can. Automatic apparatus may perform the method. The slider of a head so operated may have an oblique striking edge for deflecting large particles and may be constructed to fly with its bearing surface laterally diverging from the record surface for facilitating the dislodging of smaller particles by viscous drag.

BRIEF DESCRIPTION OF THE DRAWINGS

These and other objects and advantages of the present invention will be apparent from the following description of certain specific embodiments thereof, wherein.

DESCRIPTION OF THE PREFERRED EMBODIMENTS

Figure 1:
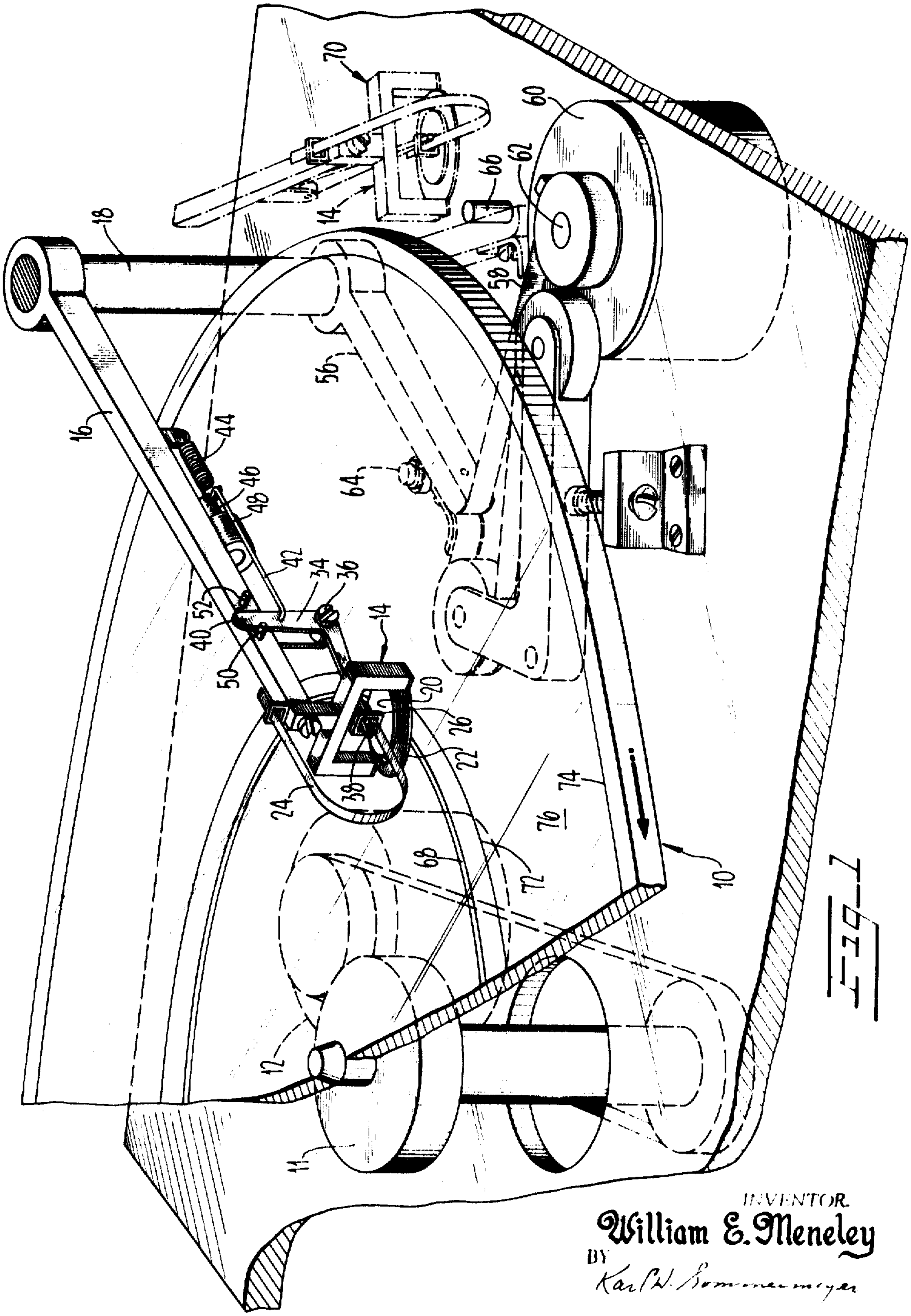
FIG. 1 is a partial, pictorial view of a magnetic-disc, data-storage apparatus with which the method of my present invention may be practiced.
Figure 2:
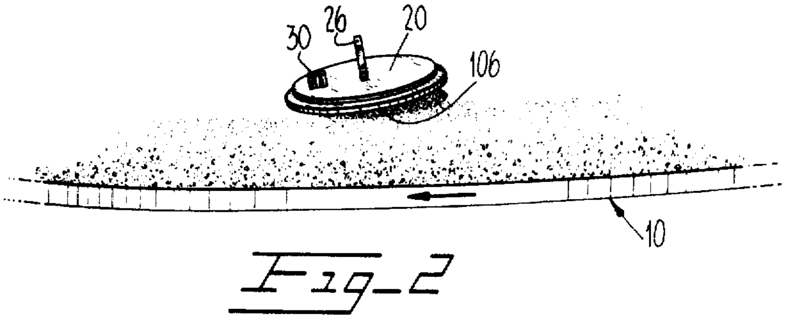
FIG. 2 is a partial, large scale, pictorial view showing the relationship of the slider of a flying transducer to a rotating record disc.
Figure 3:
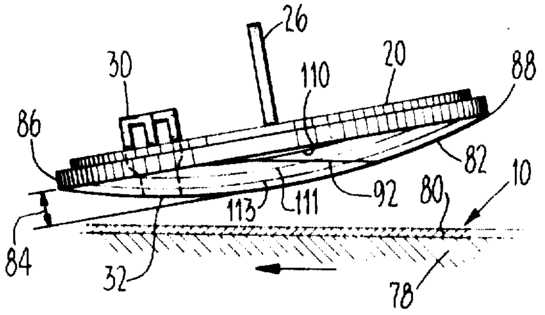
FIG. 3 is a partial, elevational view of an airborne slider with certain dimensions exaggerated, for showing its relationship to the magnetic storage disc.
Figure 5:
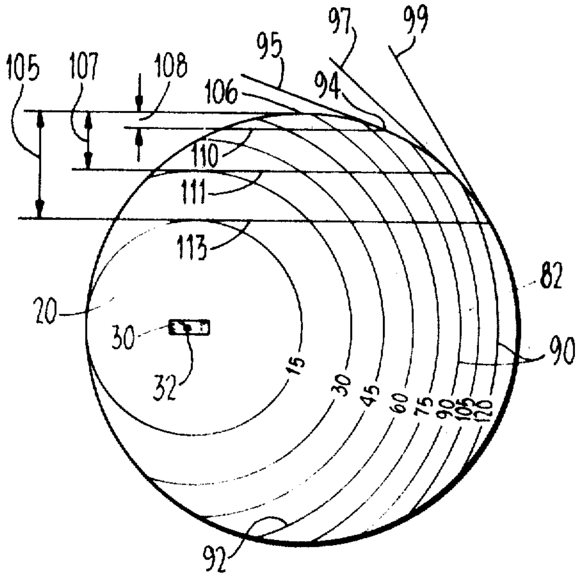
FIG. 5 is a bottom view of the slider of FIG. 3.

In the partial, perspective view of FIG. 1, a magnetic, data, surface-storage, recording disc, or member, 10, on a spindle 11 is driven, clockwise in this view, by a motor 12. A magnetic transducer head 14 is located and guided over the surface of the disc 10 by an arm 16, carried by a rotatable vertical shaft 18. The transducer head 14 includes a buttonlike slider 20 supported on a gimbal spring 22. A spring 24 engages a bracket 26 on the slider 24 for urging the slider 24 toward the disc 10 with, for example, a force of 150 to 200 grams. The transducer head 14 may be of the construction shown and described in the prior application of Meneley and Harris, Ser. No. 686,612, filed Nov. 29, 1967, now abandoned. At the operating speed of the disc 10, such as 1,200 revolutions per minute, the slider 20 rides, or flies, over the disc 10 on a thin, dynamic film of air. As is known, the moving disc 10 viscously drags air into the space between it and the bottom face of the slider 20, which constitutes an air-bearing face, and builds up sufficient pressure for supporting the slider 20 against the bias of the spring 24. Typically, the slider 20 flies 50 to 100 microinches from the disc 10 with an up-attitude, or positive angle of attach, as depicted in FIGS. 2 and 3. A magnetic transducer 30, FIGS. 2, 3 and 5, is carried in the slider 20 at a position that puts its magnetic gap close to the position 32 that is closest to the disc 10 in this flying attitude.

A bellcrank 34, hinged at 36, FIG. 1, has one lever 38 extending loose into a window of the bracket 26 on slider 20. The other arm 40 of bellcrank lever 34 is connected by a link 42 to a spring 44 for lifting the slider 20 clear of the disc 10 against the force of spring 24. The link 42 is connected also to the plunger 46 of a DC solenoid magnet 48 which, when energized, opposes the force of the spring 44 for lowering the slider 20 into operative position with respect to the disc 10. The arm 40 stops against pins 50 and 52 for limiting the motion of the bellcrank 34. In FIG. 1, the bellcrank 34 is shown in the position it occupies when the solenoid magnet 48 is energized for opposing the retracting spring 44, so that the arm 40 lies against the pin 50 and so that the arm 38 lies in the window of the brackets 26 free of actual engagement with that bracket.

A second arm 56, FIG. 1, on the shaft 18, is controlled through a steel strap 58 by a stepping motor 60, which may be of the construction shown in FIGS. 1 through 6 of Proctor, U.S. Pat. No. 3,331,974. The shaft 62 of the motor 60 rotates through somewhat less than a full turn to swing the arm 56 between stops 64 and 66, so that the arm 16 carries the transducer head 14 between a central position over a noninformation track 68 of the disc 10 and an outer, home position 70, shown in dot-and-dash, or phantom, lines, clear of the disc 10. With the transducer head 14 in this home position 70, record discs, such as the disc 10, may be removed from the spindle 11 and placed thereon.

The area or surface of the record disc 10, FIG. 1, lying between an innermost record track 72 and an outermost record track 74 constitutes an annular recording area 76. When the arm 56 lies against the stop 64, the slider 20 is positioned, as shown in full lines in FIG. 1, over the noninformation track 68, somewhat inside of the innermost information track 72. At the home position 70, the arm 56 lies against the stop 66. The slider 20 is spoken of an flying even though its action is not strictly analogous to that of an airplane. In its flight, the slider 20 is controlled, supported and guided by the control arm 16. The slider 20 is spoken of as being positioned at, or over, a track, its distance from the disc 10 is spoken of as flying height, and the supporting air pressure is referred to as lift, whether the transducer head is positioned above or below the recording disc.

Preferably, the record disc 10 includes a smooth, flat body disc 78, FIG. 3, of a suitable substrate material, such as plate glass or nonmagnetic metal, and the magnetic storage surface 80 consists of a thin film of a magnetic material laid over the substrate 78. The film 80 may be omitted from the central area of the disc including the noninformation track 68, FIG. 1.

Figure 4:
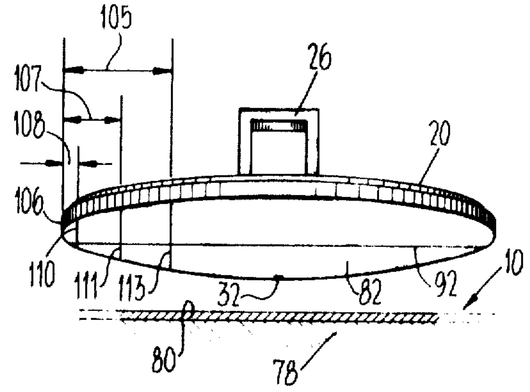
FIG. 4 is a view of the slider of FIG. 3 viewed from the right in FIG. 3.

The outermost track 74 of record area 76, FIG. 1, may have a radius of 6 inches, and the innermost record track 72 a radius of 3 inches. Two hundred data tracks, spaced 0.015 inch may be provided in this 3-inch-wide annulus, their locations being controlled by the stepping motor 60. The noninformation track 68 may be five-sixteenth inch inside of the track 72. The disc 10 may turn at 1,200 revolutions per minute. The slider 20 may be round and buttonlike, a half inch in diameter, and an eighth of an inch thick, with its bearing surface 82, FIG. 3, spherical with a radius of 42 feet so that the crown, indicated as a dimension at 84 in FIG. 3, is about 60 microinches. The spring 24, FIG. 1, may urge the slider 20 toward the disc with a force of 150 to 200 grams. Under these conditions the slider 20 will fly 50 to 100 microinches from the surface of the disc 10, and assume an angle of attack such that the point 32, FIGS. 3 and 5, closest to the disc 10, will be about one-fourth the diameter of the slider 20 forward from the extreme, trailing or downstream part 86 of the edge, or lip of the slider 20, and so that the extreme, leading or upstream part 88 of the edge or lip is about 120 microinches farther from disc 10 than is the trailing part 86. For facilitating the explanation, the curvature of the bearing surface 82, for example, in FIG. 3, and the vertical dimensions dependent on that curvature are exaggerated in the drawings. Further, the tilt of the slider 20, for example, in FIGS. 2, 3 and 4, is exaggerated correspondingly for keeping the lowest point 32 a distance forward of the trailing point 86 substantially one-fourth the diameter of the slider 20. The spacing of the slider 20 from the disc 10 is similarly exaggerated.

Since the bearing surface 82, FIGS. 3 and 5, is spherical, contour lines thereon, that is, lines connecting points equally distant from disc 10, are circles about the lowest point. Accordingly, in the bottom view of FIG. 5, circular contour lines 90 have been drawn about the point 32 which is the low point for the dimensions and flying attitude represented in FIG. 3. These contours 90 correspond to distances of 15, 30, etc. microinches above the level of the low point 32, as labeled in FIG. 5. These contours 90 would appear as horizontal lines in FIGS. 3 and 4, where the 60 microinch contour 92 is shown as a straight, horizontal line.

A surface, such as the recording area 76 of the disc 10, collects dust particles from the air. Such dust particles adhere strongly to the disc 10 and are not dislodged completely by rapping or by an air blast. Typically, such dust includes particles of hard material such as crystalline silica. The collision of such a dust particle on the surface of the disc 10 with the slider 20 can result in direct gouging of the thin magnetic surface 80, FIG. 3, can cause the slider 20 to ride up and over the dust particle, and can otherwise deflect slider 20. When so deflected and disturbed in its flight, the slider 20 itself may strike the disc 10 and damage the magnetic surface 80.

In prior devices, such dust has been removed from the disc by means of bristle brushes. I have found that the slider of the flying head itself, flying normally, will effectively remove objectionable dust particles if it is swept slowly across the disc. I have found further that dust particles show little tendency to settle onto the disc while it is in operation in an atmosphere of filtered air, and that, therefore, the disc need not be reswept as long as it continues to rotate in normal operation. Preferably, I so sweep the disc immediately after each start up. The sweeping operation may be controlled manually, but preferably, I provide control means for automatically controlling and guiding the transducer head and its slider for effectively dislodging the dust particles.

MANUAL MODE, FIG. 1

I may perform and manually control the dust clearing process in the apparatus of FIG. 1 as follows: When the apparatus of FIG. 1 is idle, the control arm 56 normally lies against the stop 66 so that the transducer head 14 is in its home position 70 in FIG. 1, but it may be anywhere between the stops 64 and 66. First, I energize the disc motor 12 and let the disc 10 come up to full speed, rotating clockwise as seen from above in FIG. 1. I leave the stepping motor 60 deenergized so that it offers only slight resistance to the motion of the control arm 56, and I leave the solenoid magnet 48 deenergized so that the spring 44 pulls the bellcrank lever 34, clockwise as seen in FIG. 1, to lift the slider 20 clear of the disc 10.

I grasp the arm 16 and move it by hand, left in FIG. 1, to carry the transducer head 14 to its extreme position, inward of the disc 10, at which position the slider 20 is over the noninformation track 68 and the arm 56 lies against the stop 64. Then, still grasping the arm 16, I move a finger against the projecting upper end of arm 40 of bellcrank 34 for moving that arm, left in FIG. 1, against the stop 50 for lowering the slider 20 into flying, or operating, position with respect to the surface of the disc 10. Accordingly, the slider 20 flies in a sweep-starting position over the noninformation track 68.

Then, continuing to hold the arm 40 against stop 50, for keeping the slider 20 in flying relation to the disc 10, I move the control arm 16 by hand, to the right in FIG. 1, at a substantially uniform speed that will carry the slider 20 across the record area 76 in about 6 seconds. This action guides and controls the slider 20 so that it moves, or sweeps, slowly and progressively from the innermost track 68 outward across the record area 76 for clearing dust therefrom as shown in FIG. 2. Although I prefer to execute this progressive sweep across the record area 76 in about 6 seconds, I get an acceptable sweep in as little as approximately 1.2 sec. A sweep longer than 6 seconds with the apparatus of FIG. 1 is acceptable, but a 6 second sweep is completely satisfactory. I continue this outward motion of arm 16 until the slider 20 is substantially at the edge of the disc 10. I then release the lever 40 of the bellcrank 34 so that the spring 44 lifts the slider 20 away from the record disc 10 because, if left in flying position, as it overhung the edge of disc 10, the slider 20 would lose lift and might drag on the edge of disc 10. I then swing the arm 16 to its extreme right position to leave the transducer head 14 in its home position 70.

This manually controlled sweeping will have cleared dust particles from the record disc 10, particularly from the recording area 76. I let the motor 12 continue to run so that the disc 10 continues to rotate at full speed. With the disc so swept, the equipment is ready for normal operation. In the apparatus of FIG. 1, the innermost, noninformation track 68 is not required on the disc 10. However, I prefer to provide it because, when the slider 20 is initially lowered onto the unswept disc 10, the slider may be struck by dust particles in a way that could damage an information track.

DISCUSSION OF DUST CLEARING ACTION

Even when care is exercised to keep dirt away from the disc 10, FIG. 1, dust accumulates on it, particularly if it is not running. Dust collects even when the disc is stored in a vertical position under seemingly clean conditions. I have found that, typically, if a previously idle disc is started up and the machine put immediately into automatic operation in which the transducer head 14 and the slider 20 are moved quickly from track to track on the recording area 76, numerous clicks will be heard, each click presumably indicating a collision of a dust particle with the slider 20. I sometimes hear a series of clicks, in synchronism with the rotation of disc 10. Presumably, such regular clicks indicate a dust particle embedded in the surface of the disc 10. Upon then stopping the disc and examining it with a microscope, I have, typically, found numerous microscopic gouges and scratches which I attribute to such collisions.

In such automatic operation, the slider typically is moved ¾ inch during a revolution of the record disc, and at that speed would cross the record area 76 of FIG. 1 in four revolutions of disc 10, or 1/5 second.

On the other hand, when I have started up such a disc and then swept it by slowly moving the slider 20 across the disc from the center outward for sweeping it according to my present invention, as previously described, I have again heard clicks, but only a few, typically a dozen, and no series of clicks synchronized with the rotation of the disc 10. Then, upon returning the slider 20 to the center of the disc 10 and again sweeping it, I have heard no clicks. From these observations, I conclude (1) that on the first sweep, all particles large enough to cause collisions were removed, (2) that most of them were removed without actually causing collisions, and (3) that further operations, as long as the disc continues rotating, will be free of such dust collisions. Furthermore, upon stopping the swept disc and examining it, I have been unable to find gouges or other damage that I could attribute to collisions with dust particles. From this observation, I conclude that the collisions, if such they were, that caused the clicks that I heard while sweeping the disc according to my invention, were of a harmless character. Certainly they were less severe than the clicks, and the collisions that presumably caused them, in the first test described above in which I did not preliminarily sweep the disc.

Figure 6:
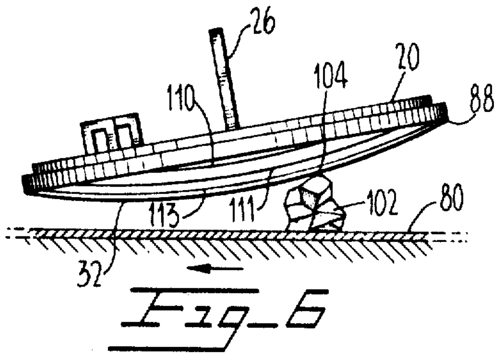
FIG. 6 is an elevation, similar to FIG. 3, depicting the collision of a dust particle with the slider.
Figure 7:
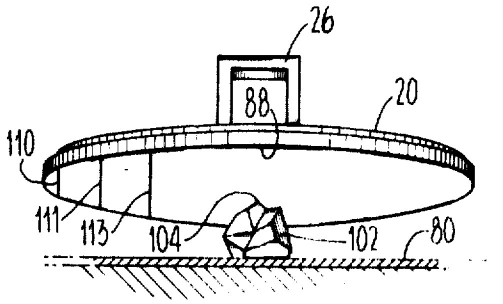
FIG. 7 is an elevation viewed from the right in FIG. 6.

The interaction between the slider 20 and the dust particles on the moving disc 10 is believed to be as follows: FIG. 6 is a view similar to FIG. 3, looking radially inward with respect to the disc 10 as seen, for example, in FIGS. 1 and 2. FIG. 7 is a view looking toward the left in FIG. 6 and shows a head-on view of the flying slider 20. It should be kept in mind that the curvature of the bearing surface 82 of the slider 20, the spacing of that surface 82 from the surface of disc 10, and the up angle of the slider 20 are greatly exaggerated in these drawings. The actual opening between the lead point 88 (FIGS. 2, 6 and 7) of the slider and the disc 10, typically 200 microinches, is about one-twentieth of the thickness of 16pound bond paper. In FIGS. 6 and 7, a dust particle 102 is shown aligned substantially with the center of the slider 20 and small enough to go under the leading part 88 of the lip of slider 20. Carried by the disc 10, the dust particle 102 collides with the bottom, or curved bearing surface 82 of the slider 20 at a point 104, FIG. 6, forward of the lowest point 32 of the slider. The collision is made severe not only by the wedging angles involved, but also by the fact that the dust particle adheres rather firmly to the disc 10. It is believed that a collision such as this can drive the dust particle 102, which may be silica, or other hard material, into the surface of the disc 10, gouging the surface thereof, and may even embed the dust particle firmly into the surface layer 80, FIG. 3, so that it strikes the slider 20 repeatedly. It is believed, also, that as the slider 20 rides over such a dust particle 102, or rolls it along the surface layer 80, the slider 20 is given a strong impetus itself to roll or pitch over the particle 102. Not only will this impetus tend to drive the leading part 88 of the lip or edge of the slider against the surface of the disc 10, but the resulting change in flying attitude will impair the lift exerted by the flowing air, and, having lost lift, the slider 20 will drop onto the disc.

When a disc such as 10 is swept according to my present invention, the dust particles do not collide with the center of the slider, but, at most, only lift the sweep-leading edge 106, FIGS. 2, 4 and 5, of slider 20, that is, the lateral edge at the side toward which the sweep is progressing.

If I sweep the slider 20, FIG. 1, across the 3-inch-wide, annular record area 76 in 6 seconds, as I prefer, with the disc 10 turning at 1,200 r.p.m., the slider 20 sweeps substantially 0.025 inch for each revolution of the disc 10. This swath of 0.025 inch is equal to one-twentieth of the width of the half-inch diameter slider 20 and is indicated by the distance 108 in FIGS. 4 and 5, which show head-on and bottom views of the slider 20. The line 110, 0.025 inch in from the edge 106, appears as a circular arc in FIG. 3.

Accordingly, I believe that when the disc 10 is swept according to the method of my present invention, most of the dust particles that will be struck by the slider 207 will be struck by this marginal portion between the line 110 and the edge 106. Particles too large to go under the slider 20 will strike, and be deflected by, the outwardly oblique, sweep-leading side of the upstream edge, as at 94 in FIG. 5. Such particles, being so struck and knocked loose from the surface of the disc 10, will be carried away by the outward flow of air that is induced by the rotation of disc 10 itself.

Figure 8:
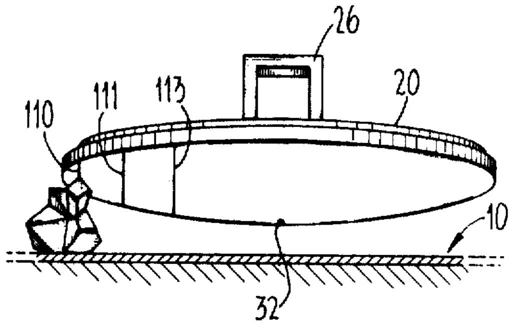
FIG. 8 is a view similar to FIG. 7, showing a different collision situation.

The action of dust particles that do go under the slider 20 and strike it is depicted in FIG. 8, which is a head-on view of the slider 20, similar to the view of FIG. 7. The effective inertia of the slider 20 in its impact on the dust particle in the situation of FIG. 8 is about half as much as it is in the situation of FIG. 7. Furthermore, there is believed to be a strong movement of air laterally outward from under the slider 20, which movement helps to carry dislodged particles clear of the slider. The air is compacted under the slider by the viscous drag, and the resulting pressure, believed to be about 5 pounds per square inch near the center of slider 20, provides the support for the slider in its flight. This body of air under pressure tends to expand in all directions so that some of it should escape laterally. This lateral escape is augmented by the lateral divergence of the bearing face 82 of slider 20, FIGS. 3 and 4, from the surface of disc 10. This lateral divergence is due to the convexity of the bearing face 82 as seen in FIG. 4 and it provides a wedge-shaped space between the slider 20 and disc 10, opening out to the side of slider 20.

Figure 9:
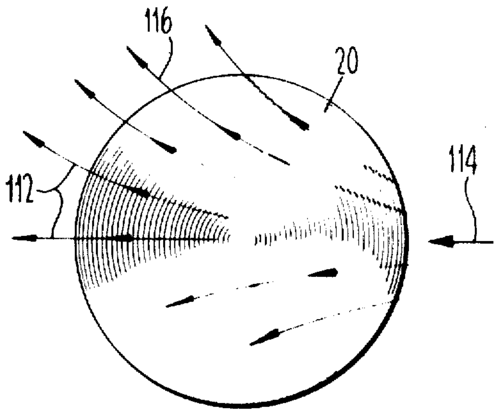
FIG. 9 is a diagrammatic plan view for depicting the flow of air relative to a slider.

I believe the flow pattern of the air under the slider 20 is somewhat as depicted by the flow arrows 112 in FIG. 9. There, the arrow 114 indicates the direction of movement of the record disc 10 and the arrows 112 indicate my estimate of the direction of airflow into and out of the space under the slider 20. Some of the air is believed to flow out laterally as indicated, for example, by the arrows 116.

Figure 10:
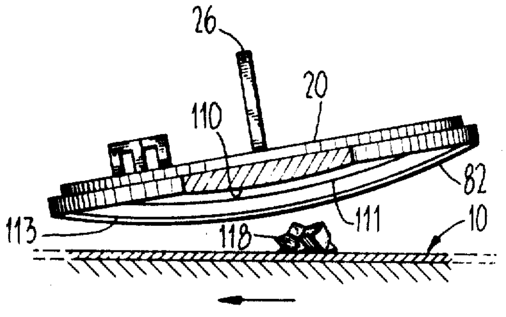
FIG. 10 is an elevational section taken along the line 10—10 in FIG. 11, depicting a noncollision situation.

I believe also that many dust particles, when swept by the method of my present invention, are removed without actual contact with the slider 20. FIG. 10 is a view similar to FIG. 3 but shows the slider 20 in section along the line 110 in FIGS. 3, 4, 5 and 11. As stated previously, the movement of the record disc 10, to the left in FIG. 10, viscously drags air with it. Similarly, as the air moving with the disc 10 passes under the slider 20, it is viscously opposed by the bottom face 82 of the slider. These opposing forces are transmitted between the slider 20 and disc 10 by the thin layer of air between them. The ability of the air to exert such forces on the slider and disc depends on the viscosity of the air, the friction between the air and the solid surfaces, and the motion of the air relative to those solid surfaces. Although the air is carried to the left in FIG. 10, by the motion of the disc 10, the air does not attain the speed of the disc 10, so that the air imposes a drag on the top face of disc 10. A dust particle 118 in FIG. 10 also feels this dragging force of the air, and because it projects above the surface may feel a larger force than would a comparable area of the surface of disc 10. I believe that this viscous drag of the air dislodges dust particles, and once their adhesion to the disc 10 has been broken, they are easily carried away by the outward flow of air, FIG. 9, laterally outward of the slider 20 and radially outward of the record disc 10. I believe that by sweeping the slider 20 slowly across the rotating record area 76, I cause the viscous drug near the high edge of the slider 20 to remove such particles, as at 118 in FIG. 11, without contact between the slider and dust particles, so that such particles are removed noiselessly and harmlessly before the lower, central part, such as 32 of the slider 20 passes over them.

I believe that this removal of dust particles by the viscous forces of the air, and without actual contact with the slider 20, is an important benefit of my invention. Although a spherical-bottom slider, such as I have described and such as I have used, shows considerable stability in flight, it should be expected to show some oscillation above and below its mean flying height. Therefore, the fact that a single sweep of the slider effectively clears the disc of dust particles, so that no collisions occur thereafter, indicates that the sweeping action extends into the air below the bottom face 82 of slider 20 far enough that after that single sweep, the highest dust particles, if any remain, are completely below the lowest levels to which the low point of the slider 20 descends in such flight.

Figure 11:
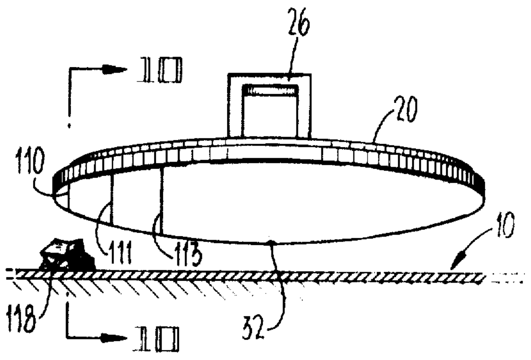
FIG. 11 is a view of the situation of FIG. 10 looking toward the left in FIG. 10.

The fact that, in sweeping a disc according to my invention, I have heard clicks, which, apparently, indicate collisions, but have found no damage to the disc, suggests, that even in this sweep across the dusty record disc, no large particles were permitted to go under the center of the slider 20 in the manner I have depicted in FIGS. 6 and 7. It is believed that in such sweeps, the clicks resulted from collisions such as depicted in FIG. 8, and the other dust particles were removed simply by the viscous drag of the air layer, as depicted in FIGS. 10 and 11.

Alternatively, if I sweep the slider 20 across the 3-inch wide, annular, record area 76, FIG. 1, in 2 seconds, with the disc 10 turning at 1,200 r.p.m., the slider 20 sweeps substantially 0.075 inch for each rotation of the disc 10. This swath of 0.075 inch is equal to three-twentieths of the width of the half-inch diameter slider 20 and is indicated by the distance 107 from the edge 106 of the slider to the line 111 in FIGS. 4 and 5.

If I sweep the slider 20 across the record area 76 in 1.2 seconds, the slider sweeps a swath of substantially 0.125 inch, equal to one-fourth of the width of the half-inch diameter slider 20, as indicated by the distance 105 from the edge 106 of the slider 20 to the line 113 in FIGS. 4 and 5. The lines 110, 111 and 113 which appear as straight lines in FIGS. 4 and 5, appear as circular arcs in FIG. 3.

With the round slider 20, the narrow swath indicated by the dimension 108 in FIG. 5 has the further advantage that it presents a smaller glancing angle to particles too large to go under the slider, and so deflects them to the side more easily. With this narrow swath the maximum glancing angle of particles striking the edge of the slider 20 is about 25°, as indicated by the line 95 in FIG. 5. With a small deflector angle, the action of breaking the dust particle loose from the disc 10 and deflecting it is gentler and therefore less likely to gouge the delicate surface. With a 0.075 inch swath, provided by the 2-second sweep, the maximum glancing angle of particles against the edge of the slider 20 is about 45°, as indicated by the line 97, and with a 0.125 inch swath, provided by the 1.2 second sweep, the maximum glancing angle is about 60°, as indicated by the line 99 in FIG. 5.

AUTOMATIC MODE, FIGS. 1 AND 12

Figure 12:
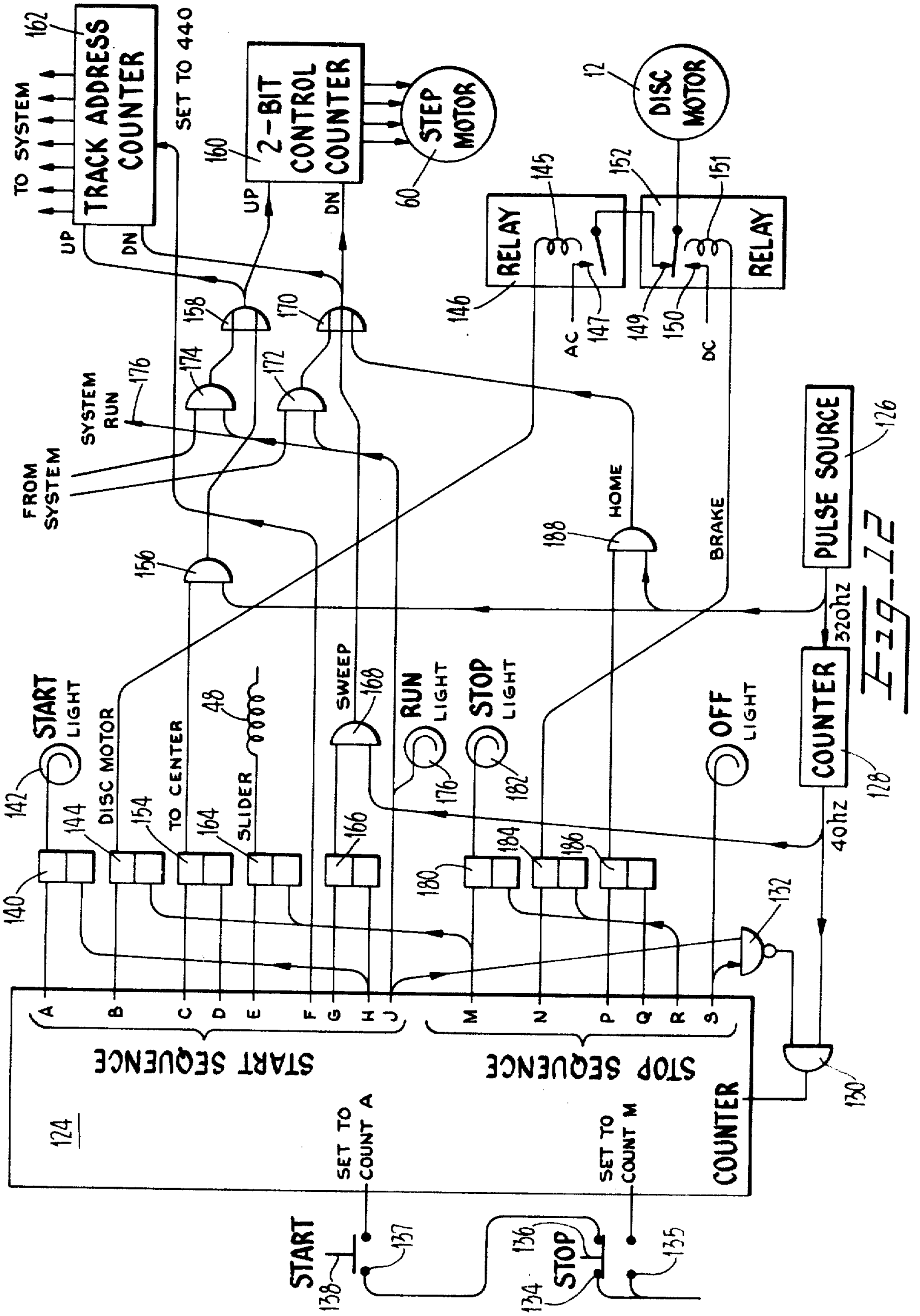
FIG. 12 is a partially schematic diagram of a control system for causing the apparatus of FIG. 1 to carry out the method of my present invention automatically.

I also provide control means for carrying out the method of my invention automatically. In FIG. 12, sequence control means includes a counter 124 having electric outputs A through J and M through S which are normally negative, but which go positive in sequence. A pulse source 126 delivers pulses at the rate of 320 per second to a counter 128 which, in turn, delivers pulses at the rate of 40 per second through an AND-gate 130 for driving the counter 124.

A pushbutton stop switch 136 has normally open contacts 135 which, when closed, provide a signal to the counter 124 for setting it to the count M for initiating a stop sequence consisting of counts M through S, as will be described. A starting circuit extends through normally closed contacts 134 of the stop switch 136, and through normally open contacts 137 of a pushbutton start switch 138. With the stop switch 136 in its normal position and the start switch 138 depressed, a signal is delivered to the counter 124 for setting it to the count A for initiating a start sequence consisting of counts A through J.

In FIG. 12, for convenience and for simplifying the diagram, control circuits, signal lines, and power circuits are indicated by single lines. Counters, gates, flip-flops, relays, pulse sources and pushbutton switches there indicated are elements well known in the art.

When the recording system is idle, the counter 124 is stopped at count S with a positive signal on the output terminal S, which signal is applied to a NOR-gate 132 for disabling the AND-gate 130, so that no driving pulses are delivered to the counter 124.

When the counter 124 is set to the count A by the closing of start switch 138, as above described, the positive S signal is ended so that AND-gate 130 is enabled and passes driving pulses to counter 124. Also, a positive voltage is delivered by the output A for setting a flip-flop 140 which, in turn, energizes a START signal light 142 for indicating that the equipment is in its start sequence. Upon release of the start switch 138, the counter 124 begins counting and, a fraction of a second later, reaches count B for energizing the output terminal B for setting a flip-flop 144 which, in turn, energizes the coil 145 of a relay 146 for closing normally open contacts 147 of that relay for applying alternating current through normally closed contacts 149 of a relay 152 to the disc drive motor 12, which is shown in FIG. 1. Accordingly, setting of the flip-flop 144, FIG. 12, by the signal from the terminal B energizes the motor 12 for the memory disc 10, FIG. 1, and puts it into operation.

The counter 124, FIG. 12, continues to count, and after about 5 seconds, to permit the disc motor 12 to come up to full speed, the counter 124 reaches the count C. The resulting positive signal from the C terminal sets a flip-flop 154 which applies an enabling signal to an AND-gate 156 which thereupon delivers pulses at 320 pulses per second from the pulser 126 through an OR-gate 158 for upcounting a 2-bit control counter 160 having two flip-flops for delivering four different states of energization to the step motor 60. This up-count drives the motor 60, FIG. 1, counterclockwise for swinging the transducer head 14 toward the left in FIG. 1. As the counter 124, FIG. 12, continues counting, the flip-flop 154 remains set so that the delivery of driving pulses to the counter 160 continues.

Approximately 3 seconds after count C, the counter 124 reaches count D and applies the D signal to the flip-flop 154 for resetting it for disabling the gate 156 and thereby stopping the delivery of up-count pulses to control counter 160. Although the transducer head 14, FIG. 1, would normally be left in its home position 70 when the equipment is idle, it may be left anywhere. The 3-second operation of the fast up-count (320 Hz.) is adequate for swinging it from one extreme position to the other. The step motor 60 requires 800 pulses for a 360° turn. The excess pulses simply crowd the arm 56 against the stop 64. This operation of the step motor 60 places the slider 20 of the transducer head 14 over the innermost, noninformation, track 68.

As the counter 124, FIG. 12, continues counting, it reaches count E at which it delivers a signal to a flip-flop 164 for setting it, which, in turn, energizes the coil 48, FIG. 1, for lowering the slider 20 to flying position with respect to the record disc 10. In this position the slider 20 is flying in a sweep-starting position over track 68.

A fraction of a second after the count E, the counter 124 reaches the count F and delivers a signal to a track-address counter 162 for setting it to the count 440. The track-address counter counts up and down in unison with the control counter 160 and indicates to the computer the particular track of disc 10 over which the slider 20 is located. The step motor 60 responds to 398 pulses for swinging the slider 20 from the outermost track 74 to the innermost information track 72 and another 42 pulses for moving it to the noninformation track 68, in which position the arm 56 lies against the stop 64. The record area 76 receives information in 200 tracks designated by even numbers from 000 for track 74 to 398 for track 72.

A fraction of a second after the count F, the counter 124, FIG. 12, reaches the count G and applies a positive signal to set a flip-flop 166 which applies a positive signal to an AND-gate 168 for enabling it to pass pulses at 40 per second from the counter 128, through an OR-gate 170 for down counting the control counter 160 for, in turn, rotating the step motor 60, FIG. 1, clockwise. The counter 124 continues counting and at count H, 440 to 450 counts after count G, applies a signal to the flip-flop 166 for resetting it and thereby disabling the AND-gate 168 and terminating the delivery of pulses to the control counter 160 of step motor 60. Accordingly, between the counts G and H of the counter 124, the step motor 60, FIG. 1, has been stepped at 40 pulses per second for sweeping the slider 20 from the innermost track 68, across the record area 76 to a position close to the outer edge of the disc 10 in a progressive sweep that has taken somewhat over 10 seconds. This action has swept the dust from the disc 10.

The signal H has also reset the flip-flop 140 for extinguishing the START indicating light 142. A fraction of a second after the count H, the counter 124 reaches the count J. The J signal is applied to the OR-gate 132 for removing the enabling signal from the AND-gate 130 for stopping the delivery of driving pulses to the counter 124. Accordingly, the counter 124 stops with the positive signal at J. This J signal is applied also to AND-gates 172 and 174 for passing control signals from the recording system through OR-gates 158 and 170 to the control counter 160 of the step motor 60. The J signal is applied also at 176 to the control system for indicating that the data storage equipment is operating and ready to read and write data on the disc 10. The J signal is also applied to a RUN indicating light 176. In this RUN condition of the apparatus, the counter 124 is stopped; the flip-flop 144 remains set so that power continues to be applied to the disc motor 12, FIG. 1, for driving it; and the flip-flop 164 remains set for keeping the solenoid magnet 48, FIG. 1, energized for holding the slider 20 in the flying position with respect to the disc 10.

Depression of the stop pushbutton switch 136, FIG. 12, for closing its contacts 135 delivers a signal to the counter 124 for setting it to the count M for initiating the STOP sequence. This action removes the positive J signal, thereby extinguishing the RUN indicating light 176, disabling the gates 172 and 174 and terminating the system-RUN signal 176. Removal of the J signal also causes the NOR-gate 132 to deliver an enabling signal to the AND-gate 130 so that driving pulses are again delivered through the gate 130 to the counter 124. Setting the counter 124 to the count M also delivers a signal to a flip-flop 180 for setting it for, in turn, energizing a STOP indicating light 182. The M signal is also applied to the flip-flops 144 and 164 for resetting them for removing energization from the disc motor 12 and slider control magnet 48, FIG. 1. Accordingly, the disc motor 12 begins to coast to a stop and the slider 20, FIG. 1, is lifted by the spring 44 away from the disc 10. Upon the release of the pushbutton 136 for opening the contacts 135, the counter 124 resumes counting. In about a half second it reaches count N and applies a signal for setting a flip-flop 184 which, in turn, energizes the coil 151 of the relay 152 for closing the contacts 150 and applying direct current to disc motor 12 for braking it.

The counter 124, FIG. 12, continues to count, and a fraction of a second after count N, it reaches count P and applies the signal to a flip-flop 186 for setting it, so that it, in turn, enables an AND-gate 188 for passing fast pulses (320 Hz.) from the pulse source 126 through the OR-gate 170 for down counting the control counter 160 for, in turn, driving the step motor 60, FIG. 1, clockwise for rapidly moving the transducer head 14 toward its home position 70. At count Q, about 2 seconds after count P, a resetting signal is applied to flip-flop 186 for disabling gate 188 and terminating the downcount of the counter 160. This 2second application of the fast downcount is more than enough to drive the transducer head 14 to home position, and the excess pulses simply crowd the arm 56, FIG. 1, against the stop 66. A second or two after count Q, the counter 124 reaches count R and delivers resetting signals to the flip-flops 180 and 184 for extinguishing the stop light 182 and discontinuing the application of direct current to the disc motor 12. Accordingly, the braking current has been applied to motor 12 for approximately 4 seconds. A fraction of a second later, the counter 124 reaches count S for energizing the OFF light and for applying a signal to the NOR-gate 132 which, in turn, removes the enabling signal from the AND-gate 130 so that driving pulses are no longer delivered to the counter 124. The system is now in idle condition with the counter 124 stopped at count S and all the flip-flops reset.

In the system of FIG. 12, the start switch 138 and stop switch 136 may be operated at any time. For example, even though the apparatus may be part way through the start sequence, as, for example, at count E, the start switch may be pressed to set the counter 124 to count A to thereby proceed again from the beginning of the start sequence.

AUTOMATIC MODE, FIGS. 1, 13 AND 14

Figure 13:
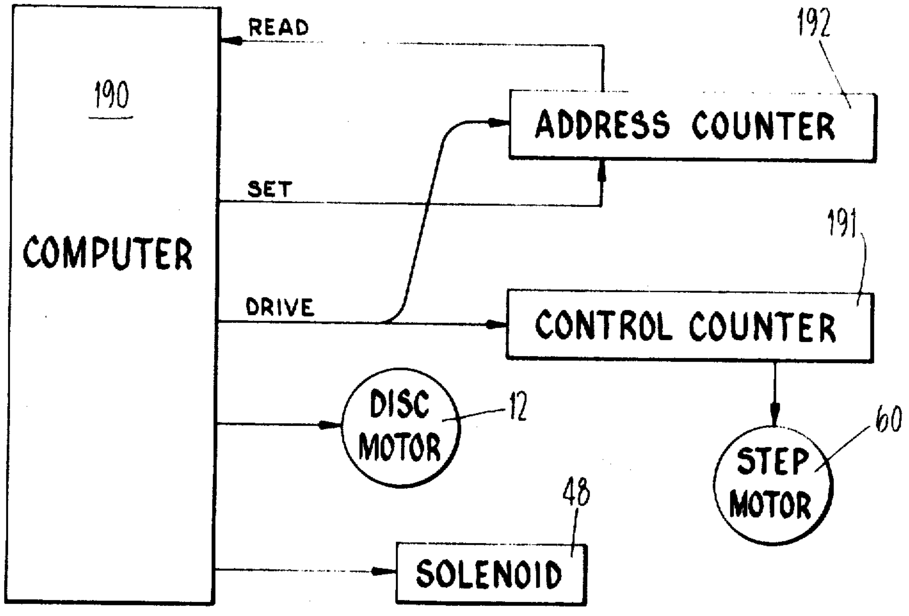
FIG. 13 is a block diagram of an alternative control system for carrying out the method of my invention in the apparatus of FIG. 1.
Figure 14:
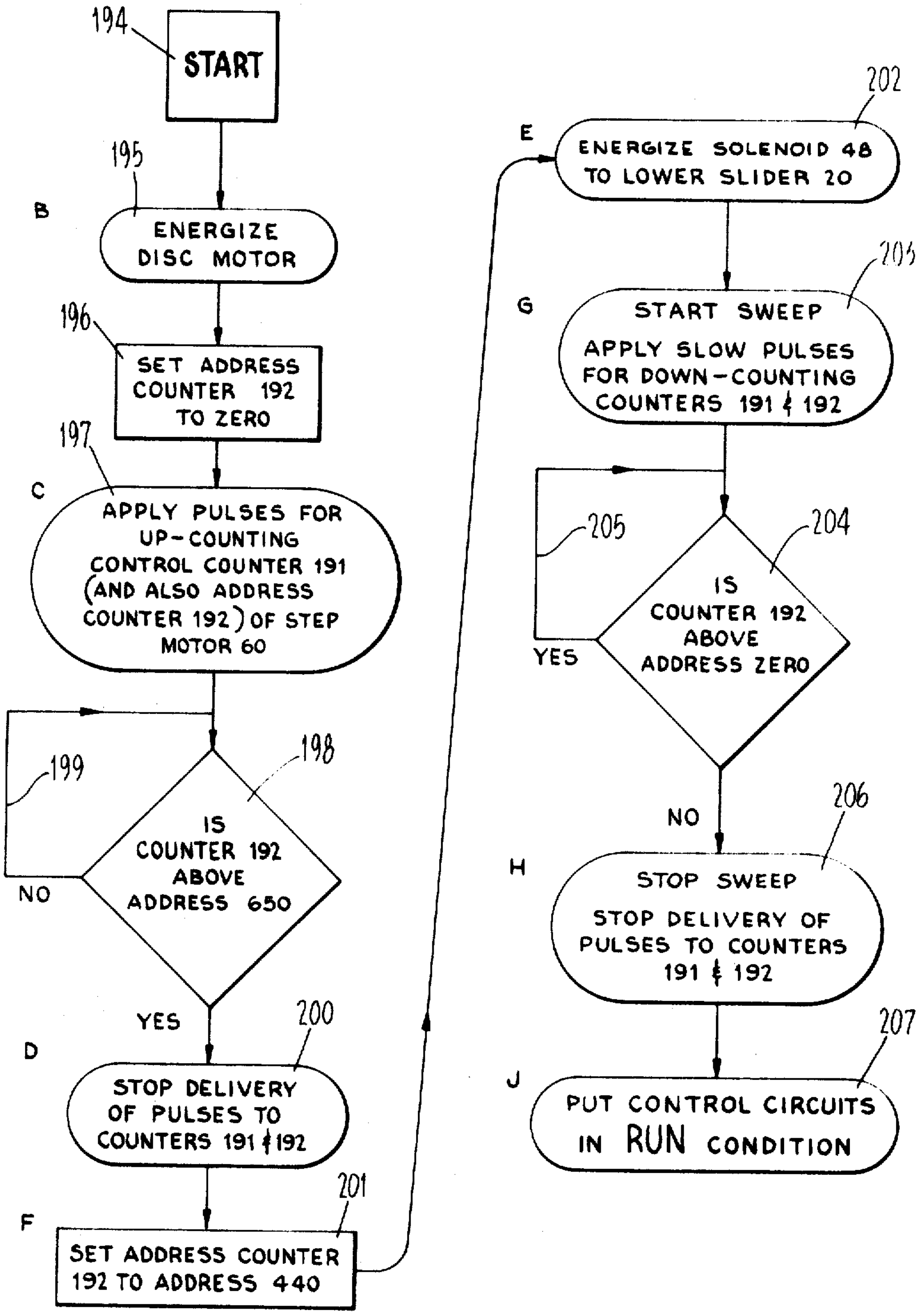
FIG. 14 is a flow diagram of the method of operation of the apparatus of FIGS. 1 and 13 performing the method of my invention.

Alternatively, the method of my invention may be carried out automatically in the apparatus of FIG. 1 by other control means, as, for example, a computer as diagrammed in FIG. 13 and controlled by a stored program for executing the operation detailed in the flow chart of FIG. 14. In FIG. 13, a general purpose computer 190 with which the record apparatus of FIG. 1 is to be used, controls and drives a control counter 191 and an address counter 192, both for the step motor 60, for driving them. The computer 190 also controls and energizes the disc motor 12, FIG. 1, and the slider control magnet 48. Included are signal and control circuits by which the computer 190 sets and reads the address counter 192.

Referring to FIG. 14, the operation, according to my method, begins with step 194 for starting the execution of the program. This start can be initiated by a manual switch as in FIG. 12 or by an automatic signal from other apparatus. At the next step 195, corresponding to count B in FIG. 12, the disc motor 12 is energized for starting the rotation of the memory disc 10, FIG. 1. At step 196, the address counter 192 is set to zero, so that it may be used for monitoring the operation of the stepping motor 60.

At step 197, FIG. 14, corresponding to control signal C in FIG. 12, pulses are applied to the control counter 191 for upcounting it and driving the stepping motor 60, FIG. 1, counterclockwise for moving the transducer head 14 toward the center of the record disc 10. The pulses are applied also to the address counter 192, FIG. 13, so that it operates in synchronism with the control counter 191. At step 198, FIG. 14, the address read from the address counter 192 is compared to the number 650. If the reading of the address is still less than 650, the control loops back, as indicated at 199 to repeat the comparison. When the address counter 192 shows an address greater than 650, the program goes on to step 200, which corresponds to signal D in FIG. 12, and at which the delivery of driving pulses to the counters 191 and 192, FIG. 13, is terminated. The rate at which pulses are delivered for driving the step motor 60 in the operation called for in steps 197, 198 and 200 is preferably low enough that the disc motor has time to come up to full speed in the time it takes for the address counter to reach count 650.

As a result of steps 197, 198 and 200, FIG. 14, the arm 56, FIG. 1, lies against the stop 64 and the slider 120 is over the innermost, sliding track 68. Excess pulses applied to the counter 191 simply crowd the arm 56 against the stop 64. With the slider in this position, step 201, FIG. 14, corresponding to signal F in FIG. 12, sets the counter 192, FIG. 13, at the address 440 for synchronizing the counter 192 with the position of arms 16 and 56, FIG. 1, so that the address counter 192, FIG. 13, will accurately indicate the position of the slider 20 over the disc 10, FIG. 1, during subsequent operations.

At step 202, FIG. 14, corresponding to signal E in FIG. 12, the solenoid 48, FIG. 1, is energized for lowering the slider 20 into flying relationship with the disc 10. The slider 20 is now at its sweep-starting position. At step 203, FIG. 14, corresponding to signal G, in FIG. 12, pulses at the rate of 40 Hz. are applied to the counters 191 and 192, FIG. 13, for down counting them and driving the step motor 60, FIG. 1, clockwise, for moving the slider 20 slowly and progressively across the disc 10 for sweeping dust therefrom. Step 204, FIG. 14, tests the address counter 192. As long as the address remains above zero, the control loops back, as indicated at 205 for repeating the test. When the counter 192 reaches the address, zero, step 206, which corresponds to signal H of FIG. 12, stops the delivery of pulses to the counters 191 and 192 for ending the sweep with the slider 20, FIG. 1, over the outermost information track 74, or slightly outside thereof. The repetitive testing action of the step 204, FIG. 14, can be fast enough that step 206 will stop the sweep before the slider 20 overhangs the outer edge of the disc 10. Step 207, FIG. 14, corresponding to signal J in FIG. 12, puts the system in running condition.

To those skilled in the art of computer design, construction, and programming, it will be apparent from FIGS. 13 and 14 that the stop sequence of FIG. 12, consisting of counts M through S therein, may be carried out by the computer of FIG. 13 similarly to the steps of FIG. 14.

ALTERNATE DISC AND TRANSDUCER CONSTRUCTION

Figure 15:
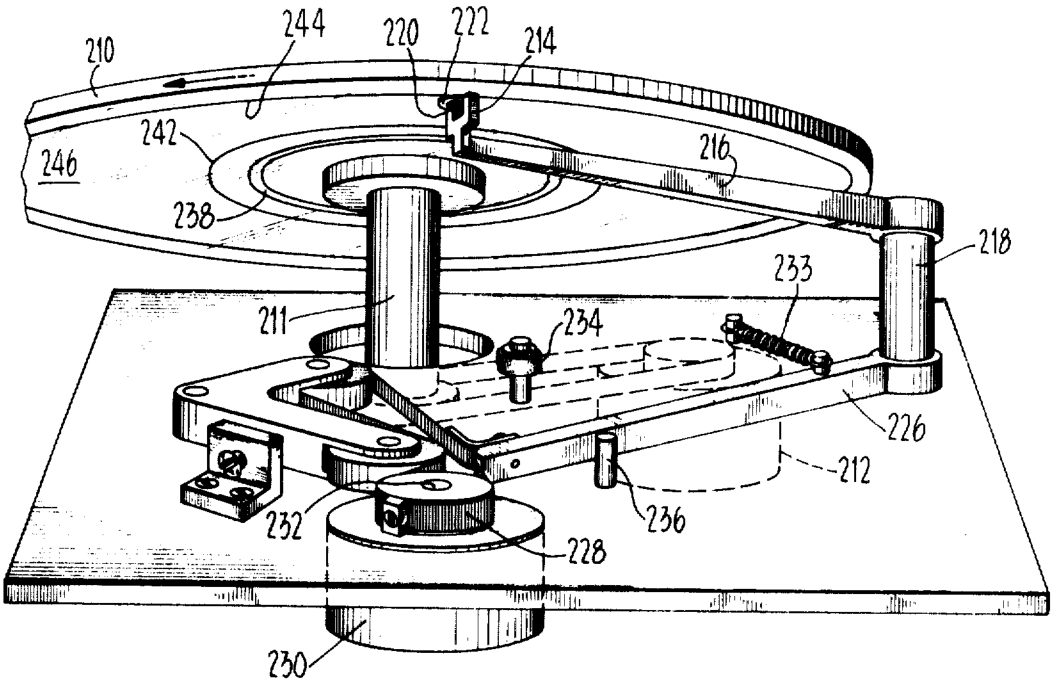
FIG. 15 is a partial pictorial view of another apparatus with which the method of my present invention may be used.
Figure 16:
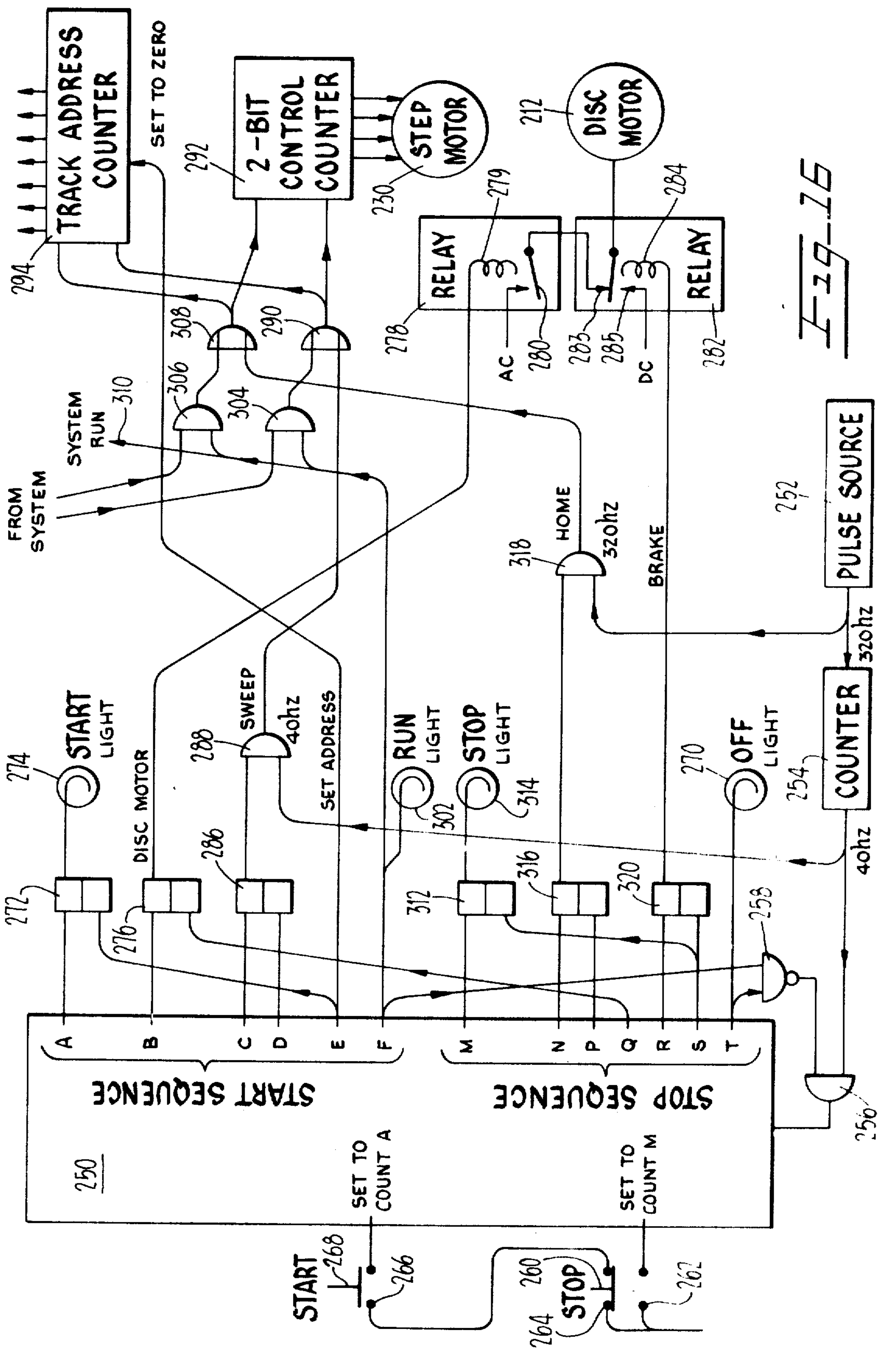
FIG. 16 is a partially schematic diagram of a control system for causing the apparatus of FIG. 15 to perform the method of my present invention automatically.

FIGS. 15 and 16 illustrate the use of the method of my present invention in a somewhat different apparatus. In the partial, perspective view of FIG. 15, a magnetic, data, surface-storage, recording disc, or member, 210, on a spindle 211, is driven, counterclockwise, as seen from below in this view, by a motor 212. A magnetic transducer head 214 is located and guided below the disc 210 by an arm 216 carried by a rotatable vertical shaft 218. The transducer head 214 includes a buttonlike slider 220, similar to the slider 20 of FIG. 1, supported on, and urged toward, the record disc 210 by a gimbal spring 222, which may be of the construction shown and described in the copending prior application of Meneley and Jones Ser. No. 702,472, filed Feb. 1, 1968, now U.S. Pat. No. 3,489,381 dated Jan. 13, 1970.

As in the construction of FIG. 1, the apparatus of FIG. 15 includes a second arm 226 on the shaft 218, controlled through a steel strap 228 by a stepping motor 230 similar to motor 60 of FIG. 1. The shaft 232 of the motor 230 rotates through somewhat less than a full turn to swing the arm 226 between stops 234 and 236, so that the arm 216 carries the slider 220 between a central position over a noninformation, sliding, or landing, track 238 of the disc 210, and an outermost information tract 244.

As in the apparatus of FIG. 1, the area of the record disc 210, FIG. 15, lying between the outermost record track 244 and an innermost record track 242 constitutes an annular record area 246. When the arm 226 lies against the stop 236, the slider is at the outermost information track 244. When the arm 226 lies against the stop 234, the slider 220 is at the noninformation, landing track 238. As in the apparatus of FIG. 1, the record area 246 of disc 210 in FIG. 15, may receive 200 data tracks, spaced 0.015 inch, their locations being controlled by the stepping motor 230. The gimbal 222 may urge the slider 220 toward disc 210, with a force of 150 to 200 grams so that the slider flies 50 to 100 microinches from the surface of the storage disc 210.

In the construction of FIG. 15, because the transducer head 214 is located below the disc, the disc 210 may be lifted from the spindle 211 or replaced, regardless of the position of the transducer head 214. Preferably, the landing track 238 serves as the home position of slider 220, as described in Meneley and Jones application, Ser. No. 740,535, filed June 27, 1968, now abandoned, and a light spring 233 is provided for returning the arms 216 and 226 to that extreme inner position when motor 230 is deenergized. For shutting down the system of FIG. 15, the flying transducer head 214 is moved to the noninformation, sliding, or landing, track 238 and held there to let the slider 220 settle onto the landing track 238 and to slide there, while the disc 210 decelerates and stops. The slider 220 then rests on the sliding strip 238 while the machine is idle. With the machine idle, the disc 210 may be lifted off the spindle 211 and simply lifted away from the slider 220. If the disc 210, or another, is then placed on the spindle, that action lays its landing track 238 over the slider 220. When the machine is again put into operation, the slider 20 remains in engagement with the landing track 238 and slides thereon while the disc 210 is brought up to a speed sufficient to cause the slider 220 to be again supported, or lifted, by the air pressure.

MANUAL MODE, FIG. 15

When the disc 210 is placed on the spindle 211, or when the machine has been standing idle, dust particles, such as silica grains, may adhere to the lower surface of the disc 210, including the record area 246. In addition, there may be dust particles on the upper, bearing face of the slider 220. To clear these dust particles away, I may proceed as follows: with the machine idle, I make certain that the arm 226, FIG. 15, lies against its stop 234, so that the slider 220 lies under, and engages, the noninformation, or landing, or sliding, track 238. I energize the disc motor 212 and let the disc 210 come up to full speed, rotating counterclockwise as seen from below in FIG. 15. As the disc 210 starts up, and slides over the slider 220, any dust particles on the slider 220 itself or on the sliding track 238, may roll between the slider 220 and disc 210, and thereby be removed. Such particles may scratch either the slider 220 or the track 238, but, because of the low speed of the first few revolutions of the disc 210, such scratching will usually be harmless, both to the bearing face of the slider 220 and to the noninformation track 238. As the disc 210 comes up to full speed the slider 220 flies. Accordingly, the slider 220 is flying in a sweep-starting position at landing track 238.

I leave the stepping motor 230 deenergized so that it offers only slight resistance to the motion of the control arm 226. I grasp the arm 226 and move it by hand, to the right in FIG. 15, to carry the transducer head 214, to the right in FIG. 15, at a substantially uniform speed that will carry the slider 220 across the record area 246 in about 6 to 10 seconds. This action guides and controls the slider 220 so that it sweeps slowly and progressively from the landing track 238, outward across the record area 246 for removing dust therefrom as shown in FIG. 2. I continue this motion of the arms 226 and 216, FIG. 15, until the arm 226 stops against the post 236. I let the motor 212 continue to run so that the disc 210 continues to rotate at full speed. With the disc 210 so swept, the equipment is ready for normal operation.

AUTOMATIC MODE, FIGS. 15 AND 16

FIG. 16 shows control apparatus for controlling the apparatus of FIG. 15 for carrying out the method of my invention automatically. In FIG. 16, sequence control means includes a counter 250 having outputs A through F, constituting a start sequence, and M through T constituting a stop sequence. These outputs are normally negative but go positive in sequence as the counter 250 operates. A pulse source 252 delivers pulses at the rate of 320 pulses per second to a counter 254 which, in turn, delivers pulses at the rate of 40 per second through an AND-gate 256 for driving the counter 250. When the recording system is idle, the counter 250 is stopped at count T with a positive signal on the output terminal T, which signal is applied to a NOR-gate 258 for disabling the AND-gate 256, so that no pulses are delivered to the counter 250.

A pushbutton STOP switch 260, FIG. 16, has normally opened contacts 262, which, when closed, set the counter 250 to its count M for initiating a stop sequence, as will be described. A starting circuit extends through normally closed contacts 264 of the STOP switch 260, and through normally opened contacts 266 of a pushbutton START switch 268. With the STOP switch 260 in its normal position and the START switch 268 depressed, a signal is delivered through the contacts 264 and 266, to the counter 250 for setting it to the count A for initiating a start sequence.

In FIG. 16, for convenience, and for simplifying the diagram, control circuits, signal lines, and power circuits are indicated by single lines. Counters, gates, flip-flops, relays, pulse sources and pushbutton switches, there indicated, are elements well known in the art.

Assume that the counter 250, FIG. 16, is stopped at the count T. The positive T signal not only causes the NOR-gate 258 to remove the enabling signal from the AND-gate 256, so that the count 250 is stopped at the count T, but also energizes an indicating light 270, for indicating that the apparatus is in its "OFF" condition. With the apparatus in this condition, if the START switch 268 is closed, as above described, for setting the counter 250 to its count A, the resulting removal of the T signal extinguishes the OFF light 270 and also removes the signal from the NOR-gate 258, so that an enabling signal is sent to the AND-gate 256, driving pulses are delivered from the counter 254 to the counter 250.

This action of setting the counter 250 to Count A also provides a positive A signal, which sets a flip-flop 272 for energizing an indicating light 274, to indicate the start sequence. Release of the START switch 268 interrupts the setting signal and permits the counter 250 to begin counting in response to the pulses received through the AND-gate 256.

A fraction of a second after so starting, the counter 250, FIG. 16, reaches the count B and delivers a positive B signal for setting a flip-flop 276, which, in turn, energizes the coil 279 of a relay 278 for closing normally open contacts 280 of that relay for applying alternating current through normally closed contacts 283 of relay 282, to the disc drive motor 212, FIG. 15. Accordingly, the setting of the flip-flop 276 by the signal from terminal B energizes the motor 212 for putting the memory disc 210 into operation. As the disc 210 starts and accelerates, track 238 slides over the slider 220 until sufficient air pressure builds up to support the slider and make it fly. Dust between the slider 220 and disc 210 may cause scratching during the first few turns of the disc, but because of the low speed of these first few revolutions, and because it occurs on the noninformation track, such sliding will usually be harmless. Accordingly, the slider 220 is flying at a sweep-starting position over track 238.

The counter 250, FIG. 16, continues to count, and after about 5 seconds, which permit the disc motor 12 to bring the memory disc 210 up to full speed, the counter 250 reaches the count C. The positive C signal sets a flip-flop 286, which applies an enabling signal to an AND-gate 288, which thereupon delivers pulses at 40 pulses per second from the counter 254 through an OR-gate 290 for down-counting a 2-bit control counter 292 for the step motor 230, FIG. 15. These down-count pulses drive the motor 230, clockwise as seen in FIG. 15. At 2 pulses per track interval, the motor 230 requires 398 pulses to move the slider 220 from the innermost information track 242 to the outermost information track 244. At 40 pulses per second, the motor 230 requires approximately 10 seconds for sweeping the slider 220 across the record area 246. This sweep is the action desired for sweeping the dust from the disc 210 and the record area 246, as previously described.

The counter 250, FIG. 16, continues to count, and at count D, approximately 12 seconds after count C, the D signal resets the flip-flop 286 for thereby disabling the AND-gate 288 and terminating the delivery of the sweep pulses to the control counter 292. The approximately 480 pulses delivered between the counts C and D are more than enough to sweep the slider 220, FIG. 15, from its innermost position at the sliding track 238 to its outermost position at track 244. The excess pulses simply crowd the arm 226 against the stop pin 236.

A fraction of a second after count D, the counter 250 reaches the count E and delivers a positive signal for resetting the flip-flop 272 for extinguishing the START light 274. The E signal also sets a track-address counter 294, which is counted up and down in unison with the control counter 292. The purpose of the track address counter 294 is to indicate to the computer the particular track at which the slider 220 is located. The E signal delivered to counter 294 sets it to the count zero, so that the address of the outermost track 244, FIG. 15, is zero.

A few seconds after the count E, the counter 250, FIG. 16, reaches count F. The resulting F signal is applied to the NOR-gate 258 for removing the enabling signal from the AND-gate 256 for terminating the delivery of pulses from the counter 254 to the counter 250 and thereby stopping the count at F. The F signal also energizes a RUN indicating light 302. The F signal is applied to AND-gates 304 and 306 for enabling them for passing control pulses from the computer through OR-gates 290 and 308, to the control counter 292 and address counter 294. The F signal is also delivered at 310 to the computer for indicating that the storage system is in RUN condition.

In this condition of the apparatus, the counter 250, FIG. 16, is stopped at the count F, the disc motor 212 is energized and running, and signals received from the computer through the gates 304 and 306 are delivered to the control counter 292 for controlling the step motor 230 and thereby the position of the flying transducer head 214, FIG. 15.

A depression of the STOP pushbutton 260, FIG. 16, will close the contacts 262 for delivering a signal to the counter 250 for setting it to count M. This action removes the F signal for extinguishing the RUN indicating light 302, for disabling the AND-gates 304 and 306, and for removing the RUN signal at 310. It also removes the signal from the NOR-gate 258 so that it applies an enabling signal to the AND-gate 256, so that driving pulses are again delivered to the counter 250. The positive M signal sets a flip-flop 312 for energizing a STOP indicating light 314. Release of the pushbutton 260 for opening the contacts 262 lets the counter 250 run. In a fraction of a second, it reaches count N at which it sets a flip-flop 316 for enabling an AND-gate 318, for delivering high-speed pulses from the pulse source 252 through the OR-gate 308 for rapidly upcounting the control counter 292. This action causes the step motor 230, FIG. 15, to rotate, counterclockwise, as seen in FIG. 15, for moving the transducer head 214, and its slider 220, to its home position, at which the slider 220 is at the innermost, or sliding, track 238.

At count P, FIG. 16, about 2 seconds after the count N, the flip-flop 316 is reset for terminating the delivery of homing pulses through the gate 318 to the control counter 292. Excess pulses have simply crowded the arm 226 against the stop 234. At count Q, a fraction of a second after the count P, a signal is delivered to the flip-flop 276 for resetting it, thereby deenergizing the coil 279 of relay 278 and interrupting the AC energization of disc motor 212. A fraction of a second later, at count R, a flip-flop 320 is set for energizing a coil 284 of the relay 282 for closing normally opened contacts 285 of that relay for applying direct current to the disc motor 212 for braking it, for quick stop. It is desirable to stop the disc motor quickly, both for reducing the time that the slider 220 must slide on the landing track 238, and also for hastening the stop sequence. About 5 seconds later, at count S, the flip-flop 320 is reset for interrupting the application of DC to the motor 212. The S signal is applied also for resetting the flip-flop 312 for extinguishing the STOP light 314. A fraction of a second later, at count T, a signal is applied to the NOR-gate 258 for disabling and AND-gate 256 and thereby halting the delivery of driving pulses to the counter 250, which, accordingly, stops at count T. This T signal also energizes the OFF signal light 270.

In this condition of the apparatus of FIGS. 15 and 16, the disc 210 is stopped, the transducer head 214 is at its innermost, or home, position, and the slider 220 rests on the sliding track 238. In FIG. 16, all the flip-flops are reset, the counter 250 is stopped at the count T, and the signal light 270 is energized to indicate that the equipment is OFF.

To those skilled in the design, construction and programming of computers, it will be apparent that the functions and operations of the apparatus of FIG. 16 may be controlled by other specific apparatus, and, in particular, may be controlled by a general purpose computer under control of a stored program similarly to the manner in which the control functions of steps B through I of FIG. 12 are carried out by the program described in the flow diagram of FIG. 14.

I claim:

1. The method of clearing dust particles or the like from a recording surface of a rotatable surface storage member prior to initiating a read/record operation with a transducer carried by a slider of a gas-borne flying head therewith, comprising the steps of:

a. rotating said storage member, b. positioning said flying head in flying relationship with said recording surface of said storage member, and c. moving said flying head progressively across said recording surface in a direction substantially transverse to the direction of motion thereof at a rate no greater than 0.25 W per revolution of said storage member, where W equals the width of said slider.

2. The method of claim 1 wherein said rate is no greater than 0.05 W.

3. The method of claim 1 wherein said direction of motion of said flying head is outwardly across said recording surface.

4. The method of claim 1 wherein said step of positioning includes the step of locating said flying head adjacent the innermost edge of said recording surface of said storage member.

5. The method of claim 1 further including the step of providing a slider having a substantially spherical flying face.

6. A method of removing unwanted particles from the recording surface of a rotatable storage member in a data storage system having a drive means for rotating said member, a gas-borne flying head having a slider, a slider transport means for supporting said slider adjacent said recording surface in a flying position and for transporting said slider transversely of said recording surface with reference to a home position, and a sweep control means for controlling the rate and direction of movement of said slider by said slider transport means, said method comprising the steps of:

a. generating a first signal for actuating said drive means to rotate said storage means;

b. generating a second signal for enabling said sweep control means to move said slider from said home position to a first predetermined position at a first sweep rate;

c. generating a third signal for enabling said sweep control means to cause slider transport means to transport said slider from said first predetermined position toward said home position at a second sweep rate;

d. generating a fourth signal for disabling said sweep control means when said slider has reached a second predetermined position; and e. generating a fifth signal for disabling said drive means after said slider has reached said second predetermined position.

7. The method of claim 6 further including the step of generating a sixth signal for enabling said transport means to move said slider into said flying position before the generation of said third signal.

8. The method of claim 6 wherein said second sweep rate is no greater than 0.25 W, where W is equal the width of said slider.

9. The method of claim 6 wherein said second sweep rate is no greater than 0.05 W, where W equals the width of said slider.

10. A surface storage system comprising:

a. a rotatable surface storage member having a recording surface;

b. a drive means for rotating said storage member;

c. a gas-borne flying head having a slider;

d. slider transport means for supporting said slider adjacent said recording surface in a flying position and for transporting said slider across said recording surface;

e. sweep control means for controlling the rate and direction of movement of said slider with reference to a home position by said slider transport means; and f. control means for causing said slider to remove unwanted particles from said surface of said recording means, said control means comprising:

i. means for actuating said drive means to rotate said storage means;

ii. means for enabling said sweep control means to move said slider from said home position to a first predetermined position at a first sweep rate;

iii. means for enabling said sweep control means to cause said slider transport means to transport said slider from said first predetermined position toward said home position at a second rate;

iv. means for disabling said sweep control means when said slider has reached a second predetermined position; and v. means for disabling said drive means after said slider has reached said second predetermined position.

11. The apparatus of claim 10 wherein said rotatable storage member comprises a magnetic disc having an annular recording surface on one face thereof.

12. The apparatus of claim 10 wherein said slider is provided with a convex flying face.

13. The apparatus of claim 10 wherein said slider face is contoured to provide a substantially wedge-shaped area with said recording surface opening in a direction toward said second predetermined position when said slider is in said flying position.

14. The apparatus of claim 10 wherein said slider transport means includes a means for retracting said slider from said flying position.

15. The apparatus of claim 10 wherein said slider transport means includes a support member for carrying said flying head and a stepping motor coupled to said support member.

16. The apparatus of claim 10 wherein said sweep control means includes an incrementable counter for providing digital control signals to said slider transport means.

17. The apparatus of claim 10 wherein said first sweep rate and said second sweep rate are equal.

18. The apparatus of claim 10 wherein said first sweep rate is greater than said second sweep rate.

19. The apparatus of claim 10 wherein said second sweep rate comprises 0.25 W per revolution of said storage member, where W equals the width of said slider.

20. The apparatus of claim 10 wherein said second sweep rate comprises 0.05 W per revolution of said storage member, where W equals the width of said slider.

21. The apparatus of claim 10 wherein said control means further includes means for generating a system run signal after said slider has reached said second predetermined position for indicating said surface storage is available for a read/record operation.

22. The apparatus of claim 10 further including a brake for retarding said drive means and wherein said control means further includes means for enabling said brake after said slider has reached said second predetermined position.

23. The apparatus of claim 11 wherein said first predetermined position comprises the innermost portion of said annular surface and said second predetermined position comprises the outermost portion of said annular surface.